United States Patent
Hahn et al.

(10) Patent No.: US 8,536,261 B2
(45) Date of Patent: Sep. 17, 2013

(54) RUBBER COMPOSITION CONTAINING TREATED SILICA AND PRODUCTS WITH COMPONENT THEREOF

(71) Applicants: Bruce Raymond Hahn, Hudson, OH (US); Byoung Jo Lee, Cuyahoga Falls, OH (US)

(72) Inventors: Bruce Raymond Hahn, Hudson, OH (US); Byoung Jo Lee, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/706,391

(22) Filed: Dec. 6, 2012

(65) Prior Publication Data

US 2013/0096260 A1  Apr. 18, 2013

Related U.S. Application Data

(62) Division of application No. 12/762,479, filed on Apr. 19, 2010, now Pat. No. 8,349,940.

(51) Int. Cl.
*B60C 1/00* (2006.01)
*C08K 3/34* (2006.01)
*C08L 9/00* (2006.01)

(52) U.S. Cl.
USPC .................... 524/492; 524/493; 524/571

(58) Field of Classification Search
USPC ........................... 524/492, 493, 571
See application file for complete search history.

(56) References Cited

U.S. PATENT DOCUMENTS

| | | | |
|---|---|---|---|
| 3,270,355 A * | 9/1966 | Tildesley | 470/20 |
| 5,484,581 A * | 1/1996 | Esch et al. | 423/335 |
| 5,708,069 A * | 1/1998 | Burns et al. | 524/403 |
| 5,723,529 A * | 3/1998 | Bernard et al. | 524/492 |
| 5,789,514 A * | 8/1998 | Burns et al. | 528/12 |
| 6,013,234 A * | 1/2000 | Ray et al. | 423/335 |
| 6,180,076 B1 * | 1/2001 | Uhrlandt et al. | 423/335 |
| 7,550,610 B1 * | 6/2009 | Chang et al. | 549/533 |
| 2005/0176852 A1 * | 8/2005 | Okel et al. | 523/216 |
| 2008/0293871 A1 * | 11/2008 | Stenzel et al. | 524/493 |

* cited by examiner

*Primary Examiner* — Angela C Scott
(74) *Attorney, Agent, or Firm* — Henry C. Young, Jr.

(57) ABSTRACT

The invention relates to rubber compositions containing a treated silica, particularly sulfur cured rubber compositions, and articles of manufacture having a component thereof such as, for example tires. The invention particularly relates to synthetic amorphous silica, particularly a precipitated silica, treated with a combination of allylsilane and dialkylsilane.

4 Claims, 1 Drawing Sheet

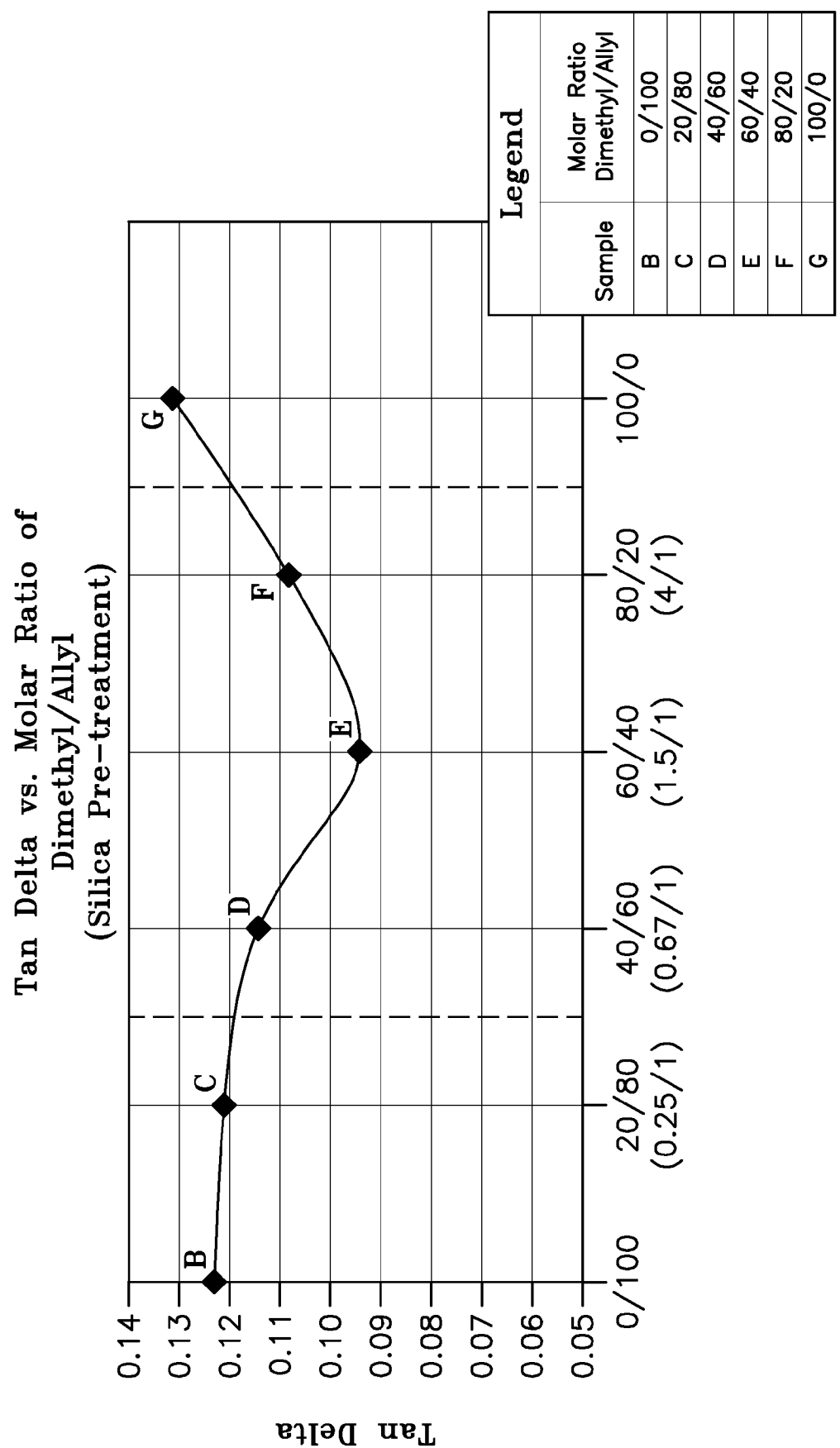

US 8,536,261 B2

RUBBER COMPOSITION CONTAINING TREATED SILICA AND PRODUCTS WITH COMPONENT THEREOF

FIELD OF THE INVENTION

The invention relates to rubber compositions containing a treated silica, particularly sulfur cured rubber compositions, and articles of manufacture having a component thereof such as, for example tires. The invention particularly relates to synthetic amorphous silica, particularly a precipitated silica, treated with a combination of allylsilane and dialkylsilane.

BACKGROUND OF THE INVENTION

Rubber compositions are often reinforced with reinforcing fillers such as at least one of rubber reinforcing carbon black and synthetic amorphous silica (e.g. precipitated silica).

Various products contain at least one component comprised of such rubber compositions such as, for example, tires.

In order to enhance rubber reinforcing effects of precipitated silica, a coupling agent is typically used in combination with the precipitated silica.

Such coupling agent typically contains a moiety (e.g. alkoxysilane group) reactive with hydroxyl groups (e.g. silanol groups) on the precipitated silica and another different moiety (e.g. polysulfide as a sulfur contributing moiety) interactive with elastomers containing carbon-to-carbon double bonds (e.g. diene-based elastomers).

A typical disadvantage of such polysulfide moiety of the silica coupling agent is its sulfur contribution at an elevated temperature of the uncured rubber composition, such as for example during physical mixing of the uncured rubber composition, which interacts with carbon-to-carbon double bonds of an elastomer in the rubber composition to promote a significantly increased viscosity of the rubber composition which leads to increased rubber processing difficulties, or challenges. Such phenomenon is well known to those having skill in such art.

For this invention, a rubber reinforcing precipitated silica is provided as a precipitated silica treated with a combination of allylsilane and dialkylsilane. It appears that such combination can produce a synergistic effect for the treated silica insofar as a tan delta physical property of a rubber composition is concerned.

A dialkylsilane for such treatment may be, for example, in a form of a dialkyldihalosilane such as for example a dimethyldichlorosilane or a dimethyldialkoxysilane such as, for example, a dimethyldiethoxysilane. An allylsilane for such treatment may, for example, be in a form of an allyltrialkoxysilane or allylhalosilane.

For this invention, it has been discovered that a precipitated silica treated with a combination of allylsilane and dialkylsilane may be used as silica reinforcement for a sulfur curable rubber composition without use of a sulfur-containing silica coupling agent. Such treated precipitated silica does not contain a polysulfidic moiety so that sulfur is not available to prematurely interact with the elastomer(s) in the rubber composition.

While the mechanism might not be fully understood, where precipitated silica is treated with an allylsilane such as for example, an allyltrialkoxysilane or allylhalosilane, together with a dialkyldihalosilane such as, for example, dimethyldichlorosilane, it is envisioned that an alkoxysilane moiety of the allylalkoxysilane or halogen moiety of the allylhalosilane reacts, for example, with hydroxyl groups (e.g. silanol groups) and/or hydrogen groups, particularly hydroxyl groups, on the precipitated silica and the dialkyldihalosilane (e.g. dimethyldichlorosilane) or dialkyldialkoxysilane (e.g. dimethyldiethoxysilane) reacts with, for example, hydroxyl groups (e.g. silanol groups) on the precipitated silica to enhance the hydrophobicity of the treated silica.

The use of a combined treatment of silica with the allylsilane and the dialkyldihalosilane or dialkyldialkoxysilane has been observed in enhanced hydrophobicity of the silica over the use of the allyl silane alone. For example the allyltrichlorosilane used to treat the silica has an area of 168.18 square angstroms when measured by molecular modeling in a hydrocarbon solvent. The dimethylsilane in a form of dimethyldichlorosilane used in the treatment has an area of 138.30 square angstroms when modeled in the same hydrocarbon environment. The smaller molecular size of the dimethyldichlorosilane allows for deeper penetration into the pores of the silica surface and therefore enables reaction with more of the hydroxyl groups present on the silica surface. It is envisioned that this enhanced hydrophobicity results in enhanced dispersion in the elastomer matrix and enhanced interaction between the silica and the elastomer.

Accordingly, a significant aspect of this invention is an interaction of the combined allylsilane with said dialkyldichlorosilane or dialkyldialkoxysilane treated precipitated silica to not only provide a delayed coupling of the treated precipitated silica with diene-based elastomer in the presence of the sulfur curative during the subsequent vulcanization of the rubber composition but to also promote an enhanced hydrophobicity of the allyl hydrocarbon treated precipitated silica to desirably cause a more efficient dispersibility of the treated silica within the rubber composition prior to the aforesaid promoted coupling of the treated silica to the diene-based elastomer to thereby enhance one or more physical properties for the rubber composition.

It is further envisioned that, if desired, because of an absence of available sulfur atoms in the case of where a sulfur containing coupling agent is not used to couple the silica to the elastomer, a beneficially relatively high temperature mixing of the combination of allyl and dialkyl hydrocarbon treated silica with the elastomer(s) can be achieved without an attendant sulfur-promoted viscosity increase of the rubber mixture prior to addition of the sulfur and sulfur cure accelerators to the rubber mixture, a higher temperature mixing of the rubber composition provides an opportunity for more efficient mixing of the rubber composition for a shorter mixing time.

Representative examples of various allylsilanes for preparation of allyl functionalized silica are, for example, allyltriethoxysilane, allyltrimethoxysilane, allyldimethylchlorosilane, allyltrichlorosilane, allylmethyldichlorosilane, diallylchloromethylsilane, diallyldichlorosilane and triallylchlorosilane.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention, a sulfur curable rubber composition (e.g. conjugated diene-based elastomer-containing rubber composition) is provided which contains a reinforcing filler comprised of a synthetic amorphous silica (precipitated silica) in a form of a precipitated silica treated with a combination of an allylsilane and a dialkylsilane in a form of, for example, a dialkyldihalosilane or dialkyldialkoxysilane.

In practice the treated precipitated silica is preferably a pretreated silica prior to its addition to the rubber composition, although, alternatively with precipitated silica may be treated in situ within the rubber composition, with said combination of allylsilane and dialkylsilane.

Alternately, said precipitated silica may be:
(A) pretreated prior to its addition to said rubber composition with said allylsilane and the product thereof treated in situ within said rubber composition with said dialkylsilane, or
(B) pretreated prior to its addition to said rubber composition with said dialkylsilane and the product thereof treated in situ within said rubber composition with said allylsilane.

In one embodiment of the invention, invention the treated, preferably pretreated, precipitated silica is provided as a precipitated silica treated with a combination of:
(A) an allylsilane comprised of:
(1) an allyltrialkoxysilane, or
(2) allylhalosilane, and
(B) a dialkylsilane comprised of;
(1) a dialkyldihalosilane, or
(2) dialkyldialkoxysilane.

In one embodiment of the invention the allyl containing hydrocarbon radical for said allylsilane may be comprised of at least one of:

—$CH_2$—CH=$CH_2$,(allyl hydrocarbon radical)

—$CH_2$—CH=CH—$CH_3$,(2-butene radical)

—$CH_2$—CH=C—$(CH_3)_2$ and (dimethallyl hydrocarbon radical)

—$CH_2$—C($CH_3$)=CH—$CH_3$(2-methyl-2-butene radical)

For said allylsilane, said allyltrialkoxysilane may, for example, be comprised of at least one of allyltriethoxysilane, allyltrimethoxysilane and allyldimethylchlorosilane.

For said allylsilane, said allylhalosilane may, for example, be comprised of at least one of allyltrichlorosilane, allylmethyldichlorosilane, diallylchloromethylsilane, diallyldichlorosilane and triallylchlorosilane.

Said dialklyldihalosilane may, for example, be comprised of dimethyldichlorosilane.

Said dialkyldialkoxysilane may, for example, be comprised of dimethyldiethoxysilane.

In one alternative embodiment, it may be desired to first treat the precipitated silica with the allylsilane and then treat the resulting product thereof with the dialkyldihalosilane or dialkyldialkoxysilane, although it is currently preferred to treat the precipitated silica with the combination of allylsilane and dialkyldihalosilane or dialkyldialkoxysilane.

It is envisioned that a general formula for precipitated silica treated with a combination of the allylsilane and dialkyldihalosilane may be represented by the general formula (I):

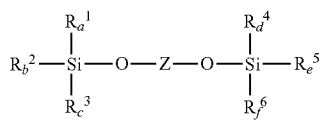

where Z represents the precipitated silica; $R^1$, $R^2$, $R^3$, $R^4$, $R^5$, and $R^6$ are the same or different radicals comprised of an alkyl group containing from 1 to 4 carbon atoms, a cycloalkyl group, a phenyl group, an alkene group containing from 3 to 18 carbon atoms or cycloalkene radical having from 5 to 8 carbon atoms;

wherein at least one of said radicals is an allyl hydrogen containing hydrocarbon radical;

wherein a is a value in a range of from 0 to 2, b is a value in a range of from 0 to 2, c is a value in a range of from 1 to 3, and d, e, and f are values in a range of 0 to 3.

In further accordance with this invention, a rubber composition is provided comprised of:
(A) at least one conjugated diene-based elastomer, and
(B) reinforcing filler comprised of:
(1) said treated silica (e.g. pretreated silica) comprised of precipitated silica treated (e.g. pretreated) with a combination of said allylsilane and dialkylsilane, or
(2) a combination of:
  (a) said treated (e.g. pretreated) silica comprised of precipitated silica treated (e.g. pretreated) with a combination of said allylsilane and dialkylsilane, and
  (b) precipitated silica without said treatment (e.g. pretreatment) with said combination of said allylsilane and dialkylsilane, or
(3) a combination of rubber reinforcing carbon black and:
  (a) said treated (e.g. pretreated) silica comprised of precipitated silica treated (e.g. pretreated) with a combination of said allylsilane and dialkylsilane, or
  (b) a combination of said treated (e.g. pretreated) silica comprised of precipitated silica treated (e.g. pretreated) with a combination of said allylsilane and dialkylsilane and precipitated silica without said treatment with a combination of said allylsilane and dialkylsilane;

wherein said allylsilane is an allylhalosilane or allylalkoxysilane, and wherein said dialkylsilane is a dialkyldihalosilane or dialkyldialkoxysilane.

Said rubber composition may further contain at least one silica coupling agent to aid in coupling said precipitated silica which has not been treated (e.g. pretreatment) with a combination of said allylsilane and diakylsilane to conjugated diene-based elastomers contained in said rubber composition (where said allylsilane is an allylhalosilane or allylalkoxysilane, and where said dialkylsilane is a dialkyldihalosilane or dialkyldialkoxysilane).

Alternately, said rubber composition may further contain at least one silica coupling agent to aid in coupling said treated (e.g. pretreated) precipitated silica comprised of a precipitated silica treated (e.g. pretreated) with a combination of said allylsilane and dialkylsilane to conjugated diene-based elastomers contained in said rubber composition (where said allylsilane is an allylhalosilane or allylalkoxysilane, and where said dialkylsilane is a dialkyldihalosilane or dialkyldialkoxysilane).

In practice, said silica coupling agent has a moiety (e.g. alkoxy group) reactive with hydroxyl groups on said silica (e.g. hydroxyl groups such as silanol groups) and another different, sulfur based, moiety interactive with elastomers contained in said rubber composition.

For example, a rubber composition is provided which is comprised of, based upon parts by weight per 100 parts by weight rubber (phr):

(A) 100 phr of at least one conjugated diene based elastomer;

(B) about 10 to about 120, alternately about 40 to about 100, phr of reinforcing filler wherein said reinforcing filler is comprised of:
  (1) about 40 to about 100, alternately about 50 to about 80, phr of said treated (e.g. pretreated) silica, namely treated silica comprised of precipitated silica treated (e.g. pretreated) with a combination of allylsilane or allylalkoxysilane with said dialkyldihalosilane or dialkyldialkoxysilane;
  (2) zero to about 60, alternately about 3 to about 30, phr of rubber reinforcing carbon black, and
  (3) optionally up to about 70 phr of precipitated silica without said treatment, namely without treatment with said combination of said allylsilane or allylalkoxysilane with said dialkyldihalosilane or dialkyldialkoxysilane.

In further accordance with this invention, an article of manufacture, such as for example a tire, is provided having at least one component comprised of said rubber composition. Such tire component may be, for example, at least one of a tire sidewall, tire sidewall insert, tire sidewall apex, ply coat, wire coat, and tread.

From a historical perspective, according to U.S. Pat. Nos. 5,708,069, 7,550,610 and 5,789,514 silica gels may be derived, for example, by hydrophobating a silica hydrogel with, for example, an organomercaptosilane and alkyl silane and drying the product. The resulting hydrophobated silica gel may be blended with natural rubber and/or synthetic rubber.

A general description of silica gel and precipitated silica may be found, for example, in the *Encyclopedia of Chemical Technology*, Fourth Edition (1997), Volume 21, Kirk-Othmer in Pages 1020 through 1023.

While silica gels are a form of precipitated silica, this invention is intended to be a significant departure therefrom in a sense of having the aforesaid required BET and CTAB surfaces area characterization in combination with the required narrow ratio thereof in a range of from 0.8 to 1.3 instead of significantly different precipitated silicas such as presented in patent publication EP 0643015 and mentioned in U.S. Patent Publication No. 2008/0293871 as indicated as being useful as an abrasive and/or thickening component in toothpaste (rather than for suitable rubber reinforcement) with a BET surface area of 10 to 130 m²/g and CTAB surface area of 10 to 70 m²/g combined with a BET to CTAB surface area ratio of approximately 1 to 5.2.

Rubber compositions are often prepared by mixing a diene-based rubber, carbon blacks and other rubber compounding ingredients, exclusive of sulfur based rubber curatives, in at least one sequential mixing step with at least one mechanical mixer, usually referred to as "non-productive" mix step, or stage(s), to an elevated temperature under high shear rubber mixing conditions followed by a final mix step, or stage, in which sulfur based curative(s), such as sulfur and sulfur cure accelerators, are added and mixed therewith at a lower mixing temperature to avoid unnecessarily pre-curing the rubber mixture during the mixing stage. The terms "non-productive" and "productive" mix stages are well known to those having skill in the rubber mixing art.

It is to be appreciated that the rubber composition is conventionally cooled to a temperature below about 40° C. between the aforesaid mix stages.

The sulfur vulcanizable elastomers may be comprised of, for example, at least one of polymers of at least one of isoprene and 1,3-butadiene and copolymers of styrene with at least one of isoprene and 1,3-butadiene.

If desired, at least one of the sulfur vulcanizable elastomers may be comprised of:
  (A) a coupled elastomer comprised of a polymer of at least one of isoprene and 1,3-butadiene and copolymer of styrene with at least one of isoprene and 1,3-butadiene,
    wherein said coupled elastomer is at least one of tin and silica coupled elastomer, or
  (B) functionalized elastomer of at least one of styrene/butadiene copolymer elastomer (SBR), c is 1,4-polybutadiene elastomer and cis 1,4-polyisoprene elastomer;
    wherein said functionalized elastomer contains functional group(s) comprised of:
    (1) amine functional group reactive with said allyl functionalized precipitated silica, or
    (2) siloxy functional group reactive with said allyl functionalized precipitated silica filler rubber reinforcement, or
    (3) combination of amine and siloxy functional groups reactive with said allyl functionalized silica, or
    (4) silane/thiol functional group reactive with said allyl functionalized silica, or
    (5) hydroxyl functional groups reactive with said allyl functionalized precipitated silica, or
    (6) epoxy groups reactive with said allyl functionalized precipitated silica, or
    (7) carboxyl groups reactive with said allyl functionalized precipitated silica.

The following examples are provided to further illustrate the invention in which the amounts and percentages of materials are by weight unless otherwise indicated.

Example I

Preparation of Treated Precipitated Silica

An evaluation of precipitated silica treated by a combination of allyl trichlorosilane and dialkyldihalosilane (namely dimethyldichlorosilane) was undertaken.

For such evaluation, the precipitated silica was pre-treated before its addition to a rubber composition by the following procedure used to prepare samples of allyl/dimethyl treated silica, namely precipitated silica treated with a combination of allyl trichlorosilane and dimethyldichlorosilane, referred to herein sometimes as "allyl" and "dimethyl".

Approximately 400 grams of precipitated silica was added to 1.5 liter of dry toluene in a 2 liter resin kettle equipped with a Dean-Stark trap and condenser. The silica-in-toluene suspension was stirred and heated to reflux and the water on the silica was removed via azeotrope with the toluene. The Dean-Stark trap collected approximately 21 ml of water. The suspension was then cooled under nitrogen to below 70° C. and approximately 200 ml of triethyl amine was added to act as a scavenger for HCl formed by the silica treatment. A mixture of allyltrichlorosilane (e.g. 47 grams) and dimethyldichlorosilane (e.g. 23 grams) in 50 ml of dry toluene was then added dropwise with stirring over 30 minutes. The mixture was stirred for 15 hours and then 0.5 liter of water was added. The pH of the mixture was then adjusted to between 7 and 8 using sodium carbonate. The resulting suspension was filtered, washed with water, and dried at 150° C. overnight.

Example II

Evaluation of Pre-Treated Precipitated Silicas

Samples of the pretreated precipitated silica of Example I were evaluated in a rubber composition. The following Table A represents the general rubber formulation. The parts and percentages are by weight unless otherwise indicated.

TABLE A

| | Parts |
|---|---|
| Non-Productive Mix Stage (NP) | |
| Cis 1,4-polybutadiene rubber[1] | 0 and 30 |
| Solution polymerized styrene/butadiene rubber (S-SBR)[2] | 0 and 70 |
| Fatty acid[3] | 1 |
| Silica coupling agent[4] | 0 and 5.2 |
| Carbon black[5] | 5.2 |
| Precipitated silica[6] | 65 |
| Productive Mix Stage (PR) | |
| Sulfur | 1.2, 1.6, and 1.8 |
| Sulfenamide sulfur cure accelerator | 1.6 and 1.5 |
| Zinc oxide | 1.5 |
| Diphenylguanidine | 1.5 and 1.0 |
| Antioxidant, amine based | 0.5 |

[1]Cis 1,4-polybutadiene rubber as Budene™ 1207 from The Goodyear Tire & Rubber Company
[2]Organic solution polymerization prepared styrene/butadiene rubber (S-SBR) as Solflex™ from The Goodyear Tire & Rubber Company
[3]Mixture comprised of stearic, palmitic and oleic acids
[4]Composites of carbon black and coupling agents in a 50-50 weight ratio were used, although reported in the Table in terms of the coupling agent itself. The coupling agents were comprised of bis(3-triethoxypropyl) polysulfide having an average of from about 3.6 to about 3.8 connecting sulfur atoms in its polysulfidic bridge from Evonic Degussa as Si69™, sometimes referred to as a tetrasulfide, and bis(3-triethoxypropyl) polysulfide having an average of from about 2.1 to about 2.3 connecting sulfur atoms in its polysulfidic bridge, sometimes referred to as a disulfide, as Si266™ from Evonic Degussa.
[5]Rubber reinforcing HAF (high abrasion furnace) carbon black as N330, an ASTM designation.
[6]Precipitated silica from Example I as Zeosil™ 1165 from Rhodia.

Samples of the rubber compositions were prepared by blending the ingredients in an internal rubber mixer using two separate, sequential, mixing stages, or steps, namely a first non-productive mixing stage (NP) to a relatively high temperature followed by a second, productive mixing stage (PR) to a significantly lower mixing temperature in which the sulfur, sulfur cure accelerator and zinc oxide were added. Such rubber mixing procedure is well known to those having skill in such art.

For the non-productive mixing stage (NP), the ingredients are mixed for about 4 minutes to an autogeneously generated, via the high shear mixing in the internal rubber mixer, drop temperature of about 150° C. at which time the batch is "dropped", or removed, from the associated internal rubber mixer. The batch is sheeted out and allowed to cool to a temperature below 40° C. The batch is then mixed in a productive mixing stage (PR) during which free sulfur, vulcanization accelerator and zinc oxide are added and mixed for a period of about 2 minutes to a drop temperature of about 110° C.

The cure behavior and various cured physical properties of the respective Samples are shown in the following Table 1. For the cured rubber Samples, the Samples were individually cured for about 30 minutes at a temperature of about 150° C.

The rubber samples are identified as Control rubber Samples A and H, without the pretreated silica, with the remainder of the rubber Samples B through G being Experimental rubber Samples which contained various of the pretreated precipitated silicas. The parts and percentages are by weight unless otherwise indicated.

TABLE 1

| Materials (phr) | Control A | B | C | D | E | F | G | Control H |
|---|---|---|---|---|---|---|---|---|
| Polybutadiene rubber | 30 | 30 | 30 | 30 | 30 | 30 | 30 | 30 |
| S-SBR rubber | 70 | 70 | 70 | 70 | 70 | 70 | 70 | 70 |
| Coupling agent | 5.2[a] | 0 | 0 | 0 | 0 | 0 | 0 | 5.2[h] |
| Untreated precipitated silica | 65 | 0 | 0 | 0 | 0 | 0 | 0 | 65 |
| Treated precipitated silica | 0 | 65[b] | 65[c] | 65[d] | 65[e] | 65[f] | 65[g] | 0 |
| Sulfur | 1.2 | 1.8 | 1.8 | 1.8 | 1.8 | 1.8 | 1.8 | 1.6 |
| Sulphenamide accelerator | 1.6 | 1.5 | 1.5 | 1.5 | 1.5 | 1.5 | 1.5 | 1.6 |
| Diphenylguanidine | 1.5 | 1 | 1 | 1 | 1 | 1 | 1 | 1.5 |
| Test Properties MDR[1], 150° C., 60 minutes | | | | | | | | |
| Max-Min torque (dNm) | 15.6 | 18.1 | 18.1 | 17.2 | 15.3 | 16.3 | 14.5 | 20.2 |
| Tensile[2], stress-strain (cured 30 min. at 150° C.) | | | | | | | | |
| 100% ring modulus (MPa) | 2.1 | 2.3 | 2.4 | 2.3 | 2.1 | 2 | 1.4 | 1.9 |
| 300% ring modulus (MPa) | 10 | 8.2 | 8 | 7.5 | 6.5 | 6 | 3.9 | 7.6 |
| Tensile strength (MPa) | 18.7 | 14.3 | 13.6 | 14 | 13 | 11.6 | 12.2 | 15.1 |
| Elongation at break (%) | 476 | 471 | 460 | 495 | 505 | 484 | 581 | 486 |
| RPA[3], 0.833 Hz, 100° C., 15% strain | | | | | | | | |
| Uncured G' (kPa) | 195 | 168 | 168 | 161 | 183 | 190 | 157 | 263 |
| RPA[3] - 100° C. cure cycle, 11 Hz, 10% strain | | | | | | | | |
| Storage modulus (G'), (kPa) | 1594 | 2005 | 2019 | 1900 | 1653 | 1737 | 1477 | 1835 |
| Tan delta | 0.107 | 0.123 | 0.121 | 0.115 | 0.094 | 0.108 | 0.131 | 0.134 |

[1]Rheometer (MDR) instrument
[2]Automated Testing System (ATS) instrument
[3]Rubber Process Analyzer (RPA) instrument For the above treated precipitated silicas referred to in Table 1 in terms of molar ratios or percent's of allyltrichlorosilane (allyl) and dimethyldichlorosilane (dimethyl):

b—treatment=100% allyl
c—treatment=80% allyl/20% dimethyl (4/1) molar ratio
d—treatment=60% allyl/40% dimethyl (1.5/1) molar ratio
e—treatment=40% allyl/60% dimethyl (0.67/1) molar ratio
f—treatment=20% allyl/80% dimethyl (0.25/1) molar ratio
g—treatment=100% dimethyl For the coupling agents in Table 1:

a=Composite of carbon black and silica coupling agent in a 50/50 weight ratio, reported in the Table in terms of the coupling agent itself. The silica coupling agent was comprised of bis(3-triethoxysilylpropyl)polysulfide having an average of from about 3.6 to about 3.8 connecting sulfur atoms in its polysulfidic bridge, sometimes referred to as being a tetrasulfide, as Si69™ from Evonic Degussa.

h=Composite of carbon black and silica coupling agent in a 50/50 weight ratio, reported in the Table in terms of the coupling agent itself. The silica coupling agent was comprised of bis(3-triethoxysilylpropyl)polysulfide having an average of from about 2.1 to about 2.3 connecting sulfur atoms in its polysulfidic bridge, sometimes referred to as being a disulfide, as Si266™ from Evonic Degussa.

It can be seen that for Experimental synthetic rubber based rubber Samples B, C, D, E, F, and G of Table 1 the blends of silica having been treated with only allyltrichlorosilane (experimental rubber Sample B) or only dimethyldichlorosilane (experimental rubber Sample G) as well as various combinations of allyltrichlorosilane and dimethyldichlorosilane (referred to herein as allyl and dimethyl, respectively), namely experimental rubber Samples C, D, E and F, all exhibited lower uncured G' values than the control rubber Samples A and H, with a minimum value of uncured G' being observed for the combination of the allyltrichlorosilane and dimethyldichlorosilane in a ratio of 40/60 namely for rubber Sample D.

This is considered significant in a sense that uncured G' is an important indicator for rubber compounding processing. As the uncured G' value goes lower, rubber processing becomes easier, namely the rubber composition becomes easier to process in a sense that it takes less energy to process.

In Table 1, the tan delta values for the allyl/dimethyl treatment show a minimum value for rubber Sample E, which used a 40/60 molar ratio of allyltrichlorosilane (allyl) and dimethyldichlorosilane (dimethyl) treatment.

BRIEF DESCRIPTION OF DRAWING

A drawing is provided as FIG. 1 (FIG. 1) to reflect an observed relationship of tan delta values of the rubber composition with precipitated silica pretreated with allyltrichlorosilane (allyl) or dimethyldichlorosilane (dimethyl) individually (Samples B and G) or with what appears to be a synergistic combination of allyltrichlorosilane and dimethyldichlorosilane.

THE DRAWING

In FIG. 1 the tan delta values are plotted for experimental rubber Samples B through G which were reported in Table 1.

The plot of FIG. 1 shows tan delta values for experimental rubber Samples B, C, D, E, F and G which contained the precipitated silica treated individually (Samples B and G) or with a combination of (Samples C, D, E and F) various ratios of the allyltrichlorosilane and dimethyldichlorosilane.

It is readily observed in FIG. 1, and in this Example, that a minimum tan delta value is reached for experimental rubber Sample D which contained the silica pretreated with an apparent synergistic combination of the allyltrichlorosilane and dimethyldichlorosilane with a molar ratio of 60/40 (1.5/1) of allyltrichlorosilane (allyl) to dimethyldichlorosilane (dimethyl).

If it is desired for the tan delta value for the rubber composition to be about 0.12 or less, for a rubber processing advantage over rubber Samples B and G, then experimental rubber samples D, E and F appear to be appropriate which used the precipitated silica pretreated with allyltrichlorosilane and dimethyldichlorosilane in molar ratios ranging from about 0.55/1 to about 9/1 as illustrated in FIG. 1 by the approximating vertical dashed lines. It appears that a molar ratio in a region of about 1.5/1 (about 60/40) may be an optional molar ratio where a minimum tan delta value is desired.

The reduced tan delta values for the rubber composition, as observed in this Example, resulting from use of the precipitated silica treated with a combination of the allyltrichlorosilane and dimethyldichlorosilane, are considered significant in a sense that the lower tan delta values are indicative of lower hysteresis for the rubber composition. The lower hysteresis of a rubber composition used in a tire tread is indicative of better fuel economy for an associated vehicle with a tire having a tread of such rubber composition. Accordingly, a lower tan delta for the rubber composition is indicative of better fuel economy for the associated vehicle with a tire with a tread of such rubber composition.

It is also concluded, and it is an additional significant aspect of this invention, that it is observed that the reported data in Table 1 for the uncured G' data indicates that the precipitated silica treated with the combination of both allyltrichlorosilane and dimethyldichlorosilane resulted in significantly improved (reduced) uncured G' values for the rubber composition, for which the combination of allyltrichlorosilane and dimethyldichlorosilane treatment of the precipitated appears have a synergistic effect, as compared to use of precipitated silica treated individually with the allyltrichlorosilane or dimethyldichlorosilane, namely Samples B and G, or with the untreated precipitated silica used with traditional silica coupling agents, namely rubber compositions A and H.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition which comprises adding a precipitated silica to a rubber composition comprised of at least one conjugated diene-based elastomer wherein said precipitated silica is treated prior to its addition to said rubber composition with a combination of an allylsilane and a dialkylsilane, where said dialkylsilane is in a form of a dialkyldihalosilane or dialkyldialkoxysilane, and where said precipitated silica does not contain a sulfur that is available to prematurely interact with the elastomers in the rubber composition.

2. The process of claim 1 wherein said precipitated silica is first treated with said allylsilane and the resulting product thereof treated with said dialkyldihalosilane or dialkyldialkoxysilane.

3. The process of claim 2 wherein said rubber composition contains a silica coupling agent to aid in coupling said treated precipitated silica to said conjugated diene-based elastomer(s) where said coupling agent is comprised of a moiety reactive with hydroxyl groups contained on said treated precipitated silica and another different moiety interactive with said conjugated diene-based elastomer(s).

4. The process of claim 1 wherein said rubber composition contains a silica coupling agent to aid in coupling said treated precipitated silica to said conjugated diene-based elastomer(s) where said coupling agent is comprised of a moiety reactive with hydroxyl groups contained on said treated precipitated silica and another different moiety interactive with said conjugated diene-based elastomer(s).

* * * * *